United States Patent
Clingman et al.

(10) Patent No.: US 11,088,593 B2
(45) Date of Patent: Aug. 10, 2021

(54) BIASED CENTRALIZING ARMS BEARING IN SUBMERSIBLE PUMP MOTOR

(71) Applicant: Baker Hughes Oilfield Operations LLC, Houston, TX (US)

(72) Inventors: James Christopher Clingman, Broken Arrow, OK (US); John Knapp, Claremore, OK (US); Kenneth O'Grady, Collinsville, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 183 days.

(21) Appl. No.: 16/446,837

(22) Filed: Jun. 20, 2019

(65) Prior Publication Data
US 2020/0067378 A1  Feb. 27, 2020

Related U.S. Application Data

(60) Provisional application No. 62/721,882, filed on Aug. 23, 2018.

(51) Int. Cl.
*H02K 5/24* (2006.01)
*H02K 5/132* (2006.01)
*H02K 5/167* (2006.01)
*H02K 16/02* (2006.01)
*E21B 43/12* (2006.01)
*H02K 7/08* (2006.01)

(52) U.S. Cl.
CPC ............. *H02K 5/24* (2013.01); *E21B 43/128* (2013.01); *H02K 5/132* (2013.01); *H02K 5/1677* (2013.01); *H02K 7/088* (2013.01); *H02K 16/02* (2013.01); *H02K 2205/03* (2013.01)

(58) Field of Classification Search
CPC .......... H02K 5/24; H02K 16/02; H02K 5/132; H02K 5/167; H02K 7/08; H02K 2205/03; H02K 7/088; H02K 5/1677; E21B 43/12; E21B 43/128
See application file for complete search history.

(56) References Cited

U.S. PATENT DOCUMENTS 5,818,131 A * 10/1998 Zhang ................. F16C 32/0444
                                                         310/15
6,091,175 A    7/2000 Kinsinger
(Continued)

FOREIGN PATENT DOCUMENTS

KR    1020050119378 A    12/2005

OTHER PUBLICATIONS

International Search Report and Written Opinion of PCT Application No. PCT/US2019/040799 dated Oct. 24, 2019: pp. 1-11.

*Primary Examiner* — Naishadh N Desai
(74) *Attorney, Agent, or Firm* — Bracewell LLP; Keith Derrington

(57) ABSTRACT

A submersible pump electrical motor has a stator with a stator bore, a shaft with rotor sections in the stator bore, and a shaft bearing between rotor sections. The bearing has a bearing body having a hub and centralizing arms circumferentially spaced around the hub. Each of the arms curves and is biased against the stator bore wall. A tab on at least one of the arms engages a slot in the stator bore wall. The bearing body, the hub, and the arms are formed of a single-piece monolithic metal that undergoes elastic deflection of the arms when the bearing body is installed in the stator bore.

18 Claims, 3 Drawing Sheets

(56) References Cited

U.S. PATENT DOCUMENTS

| | | |
|---|---|---|
| 6,566,774 B2 | 5/2003 | Parmeter et al. |
| 6,956,310 B1 | 10/2005 | Knox |
| 7,780,424 B2 | 8/2010 | Parmeter et al. |
| 8,342,821 B2 | 1/2013 | Prieto |
| 8,567,042 B2 | 10/2013 | Neuroth et al. |
| 9,127,683 B2 | 9/2015 | Knapp |
| 9,624,938 B2 | 4/2017 | Forsberg |
| 9,941,770 B2 | 4/2018 | Rumbaugh et al. |
| 2015/0188384 A1* | 7/2015 | Rumbaugh ............ H02K 5/167 310/90 |
| 2015/0292552 A1* | 10/2015 | Thompson ............ F16C 17/024 384/103 |
| 2016/0208848 A1* | 7/2016 | Swanson ................ F16C 43/02 |
| 2019/0123609 A1 | 4/2019 | Wilcox et al. |

* cited by examiner

BIASED CENTRALIZING ARMS BEARING IN SUBMERSIBLE PUMP MOTOR

CROSS-REFERENCE TO RELATED APPLICATION

This application claims priority to provisional application Ser. No. 62/721,882, filed Aug. 23, 2018.

FIELD OF THE DISCLOSURE

This disclosure relates in general to submersible well pump motors and in particular to a motor bearing having a hub with biased centralizing arms extending outward from it.

BACKGROUND

Electrical submersible pump (ESP) motors can be very long and small in diameter. To obtain sufficient horsepower, multiple rotor sections are mounted on the same shaft inside the stator with radial support bearings between each rotor section. These bearings comprise a bearing sleeve mounted on and rotating with the shaft and a corresponding carrier body in frictional engagement with the inside diameter of the stator.

Various bearing designs exist to maintain the shaft centered and to prevent rotation of the carrier body in the bore of the stator. In one type, an annular elastomeric ring encircles the carrier body and frictionally engages the stator bore. Vibration continues to be a problem.

SUMMARY

A submersible pump electrical motor, comprises a stator having a stator bore with a longitudinal axis and an inward-facing stator bore wall. A shaft extends through the stator bore along the axis. First and second rotor sections are mounted to the shaft for rotation therewith. A bearing body has a hub with a hub bore through which the shaft extends. A plurality of centralizing arms extend outward from the hub and are biased against the stator bore wall.

In the embodiment shown, the stator has an axially extending slot in the stator bore wall. A tab on an outer portion of one of the centralizing arms fits within the slot to prevent rotation of the bearing body relative to the stator. The tab may extend radially outward from the tip.

The centralizing arms are formed of a metal. In the embodiment shown, the bearing body, including the hub and the arms, is formed of a single, monolithic piece of a non-magnetic metal.

Each of the centralizing arms may gradually decreases in thickness from a junction with an exterior of the hub to a tip of the centralizing arm.

The centralizing arms circumscribe an outer diameter while the bearing body is removed from the stator bore that is greater than an inner diameter of the stator bore, resulting in an elastic deflection of the centralizing arms when the bearing body is inserted within the stator bore.

Each arm has a base where it joins the hub. Each arm may have a curved inward-facing side extending from the base to a tip that is radially spaced outward from an exterior of the hub. Each arm may have a curved outward-facing side extending from the base to the tip. A thickness of each arm measured from the inward-facing side to the outward-facing side decreases from the base to the tip.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 2:
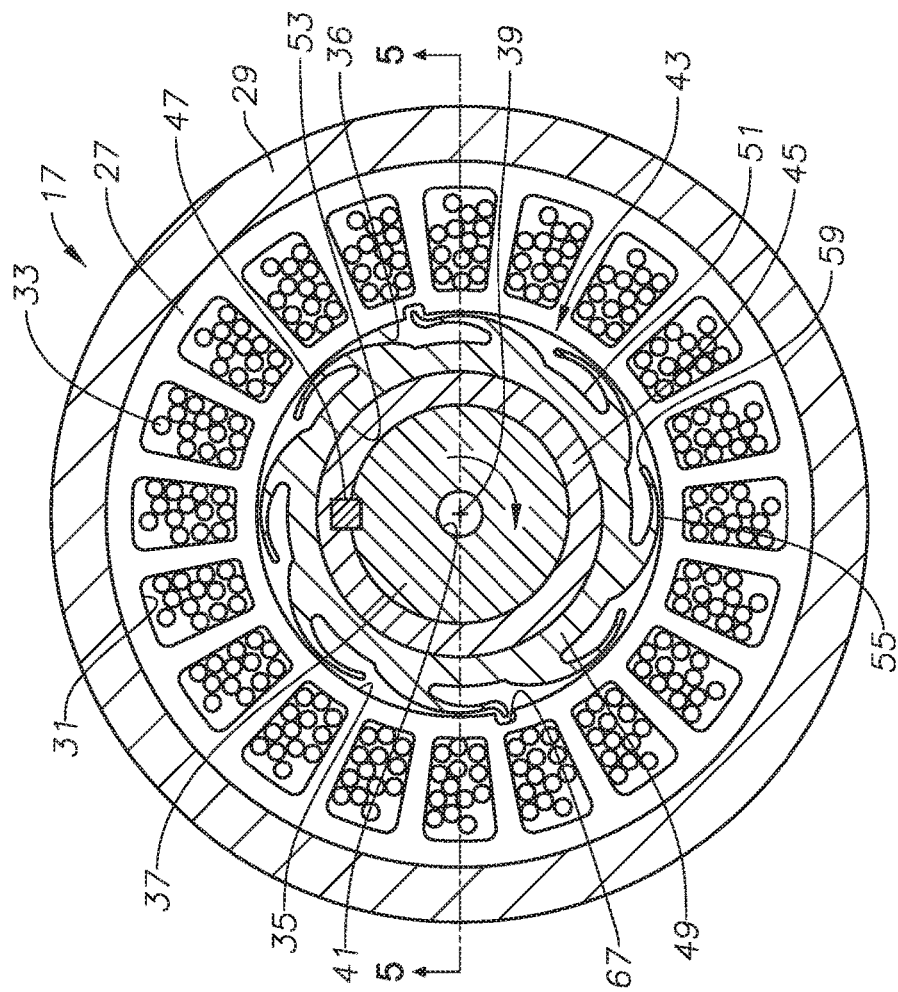
FIG. 2 is a partly simplified sectional view of the motor of FIG. 1, taken along the line 2-2 of FIG. 1, illustrating one of the motor bearings.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
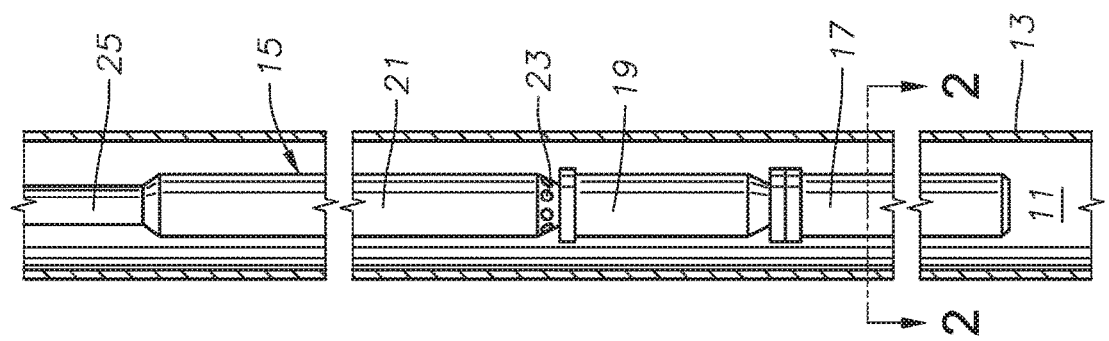
FIG. 1 is a side view of an electrical submersible pump assembly in accordance with this disclosure and installed in a well.

Referring to FIG. 1, a well 11 has casing 13 that is perforated or has other openings to admit well fluid. An electrical submersible pump assembly (ESP) 15 is suspended in well 11 to pump well fluid from well 11. Although shown installed vertically, ESP 15 could be located within an inclined or horizontal section of well 11 or it could be located exterior of well 11 for boosting the pressure of well fluid flowing from the well. The terms "upper", "lower" and the like are used herein only for convenience.

ESP 15 includes a motor 17, normally a three-phase electrical motor. A seal section or pressure equalizer 19 connects to motor 17 if ESP 15 is submersed. Seal section 19 may have components, such as a bladder or bellows, for reducing a pressure differential between dielectric lubricant contained in motor 17 and the hydrostatic pressure of the well fluid in well 11. Although shown above motor 17, the pressure equalizing components of seal section 19 could be mounted to a lower end of motor 17.

A pump 21 connects to the opposite end of seal section 19. Pump 21 may be a centrifugal pump with numerous stages, each stage having an impeller and a diffuser. Alternately, pump 21 may be a progressing cavity pump, having a helical rotor that rotates within an elastomeric stator. Pump 21 could also be a reciprocating type. Pump 21 has an intake 23 for drawing in well fluid. Intake 23 may be at the lower end of pump 21 or in an upper end of seal section 19. A gas separator (not shown) may be mounted between motor 17 and pump 21, and if so, intake 23 would be located in the gas separator. A string of production tubing 25 suspends ESP 15 in casing 13 in most installations.

Referring to FIG. 2, motor 17 has a stator 27 that is fixed in a motor housing 29. Stator 27 may be conventional and is made up of a stack of laminations, which are thin steel discs having slots 31 through which windings 33 are wound. Only three slots 31 are shown, but in practice slots 31 are spaced completely around stator 27. The laminations have central openings that define a stator bore 35 with an inward-facing cylindrical surface or stator bore wall 36.

A shaft 37 extends through stator bore 35 along a longitudinal axis 39. Shaft 37 may have an axial passage 41 for distributing a dielectric lubricant. Radial bearings 43 (only one shown) are spaced axially along the length of shaft 37 for providing radial support. Each radial bearing 43 includes a bearing sleeve 45 that mounts to shaft 37 for rotation therewith. In this example, a key 47 fits within mating key slots on the outer diameter of shaft 37 and inner diameter of bearing sleeve 45.

A non-rotating bearing body 49 has a hub 51 with a hub bore 53 that closely receives bearing sleeve 45. Bearing sleeve 45 is in rotating, sliding engagement with hub bore 53. Centralizing arms 55 join and curve outward from the exterior of hub 51 in this embodiment. The outward facing side of each centralizing arm 55 is biased against stator bore 35 by an amount based on the resiliency of each centralizing arm 55. Bearing body 49, including hub 51 and centralizing arms 55 may be formed of a single-piece of monolithic metal.

Figure 3:
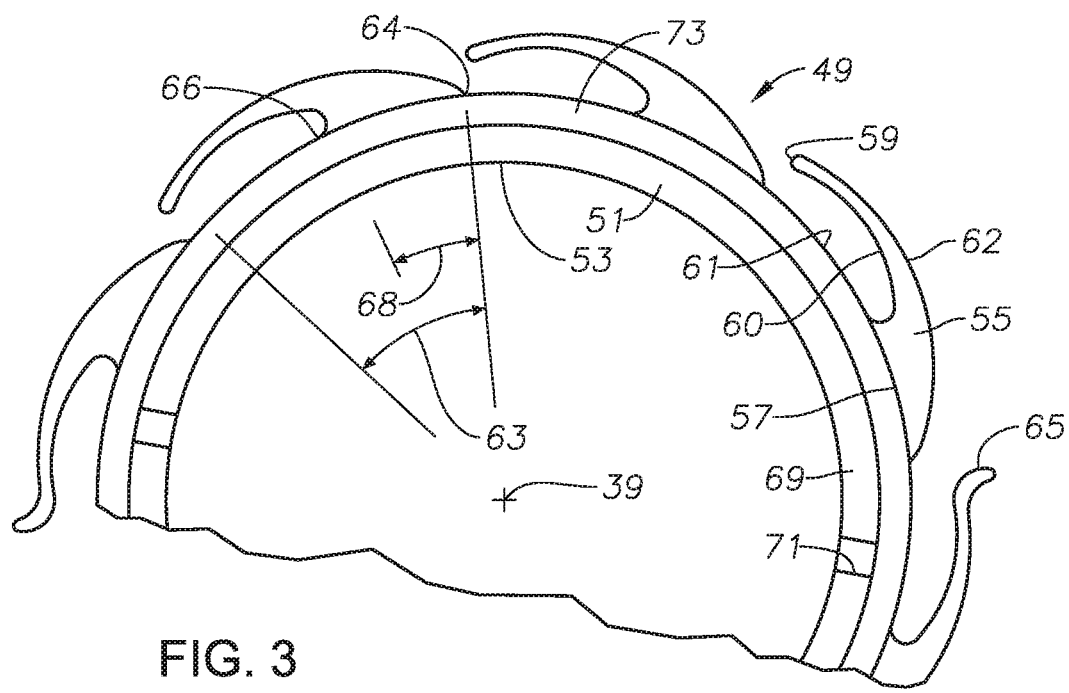
FIG. 3 is an end view of the bearing body of the motor bearing of FIG. 2, shown removed from the motor.

Referring also to FIG. 3, the outer portions of centralizing arms 55 circumscribe an outer diameter that prior to insertion of bearing body 49 into stator bore 35 is greater than the inner diameter of stator bore 35. As a result, when inserted into stator bore 35, centralizing arms 55 deflect inward, exerting a bias force against stator bore wall 36. The amount of deflection is less than the yield strength of the metal of bearing body 49, resulting in elastic deflection. Chamfers (not shown) may be located on upper and/or lower ends of centralizing arms 55 to facilitate the insertion of bearing body 49 into stator bore 35.

The metal of bearing body 49, including its hub 51 and centralizing arms 55, may be non-magnetic so as to avoid influencing the electromagnetic fields emanating inward from stator 27. For example, the metal may be a stainless steel or aluminum. Alternately, a section of the discs in the stack of stator 27 radially outward from each bearing body 49 could be non-magnetic; in that case, bearing body 49 could be a ferrous material that has magnetic properties.

Bearing body 49 is preferably manufactured by three-dimensional printing techniques. Alternately, bearing body 49 may be formed as a casting, such as by lost wax casting techniques. Three-dimensional printing techniques may be employed for manufacturing the mold components that would be used for making the casting.

Each centralizing arm 55 has a curved cantilevered configuration in this embodiment, with a base 57 integrally joining the exterior of hub 51 and a tip 59 spaced circumferentially from base 57. Each centralizing arm 55 gradually decreases or tapers in thickness from base 57 to tip 59 measured from the inward-facing side 60 to the outward-facing side 62. Base 57 has a much greater thickness than tip 59 in this embodiment. Tip 59 is spaced outward from the exterior of hub 51 by a gap, resulting in an open recess 61 between the inward-facing side 60 of each centralizing arm 55 and the exterior of hub 51, which is cylindrical in this example. The mouth of recess 61 could face away from the direction of rotation of shaft 37, as shown in FIG. 2, or it could face into the direction of rotation. Bearing body 49 does not rotate, so centralizing arms 55 can curve into the direction of rotation or away from the direction of rotation.

The curvature and taper of centralizing arms 55 and the radial dimension from the exterior of hub 51 to the circumscribed outer diameter of centralizing arms 55 prior to insertion in stator bore 35 varies based on the inner diameter of stator bore 35 and other factors concerning motor 17. In this example, each tip 59 terminates approximately on a radial line passing through a junction 64 of the outward-facing side 62 of an adjacent centralizing arm base 57 with hub 51. A radial line passing through the outward-facing side junction 64 relative to a radial line passing through tip 59 is at an angle 63 that is illustrated as an acute angle of about 45 degrees, but it may vary. The width of base 57 is the circumferential distance from outward-facing side junction 64 to a junction 66 of the inward-facing side 60 with hub 51. In this example, an angle 68 between a radial line passing through outward-facing side junction 64 and a radial line passing through inward-facing side junction 66 is illustrated to be an acute angle of about 25 degrees.

The example in the drawings show centralizing arms 55 as curving slightly inward at tips 59. However, tips 59 could circumscribe an outer diameter that is the same as the maximum circumscribed outer diameter of centralizing arms 55. That is, tips 59 could be in contact with stator bore 35, rather than slightly radially inward as shown in FIG. 2. The outward-facing side 62 of each centralizing arm 55 from the end of base 57 to tip 59 may be a compound curve having more than one radius. The inward-facing side 60 of each centralizing arm 55 from the other end of base 57 to tip 59 may also be a compound curve, but it will have different radii than outward-facing side 62 because of the taper in thickness of centralizing arm 55. In the embodiment shown, the radii of inward-facing side 60 and outward facing side 62 do emanate from axis 39.

Figure 4:
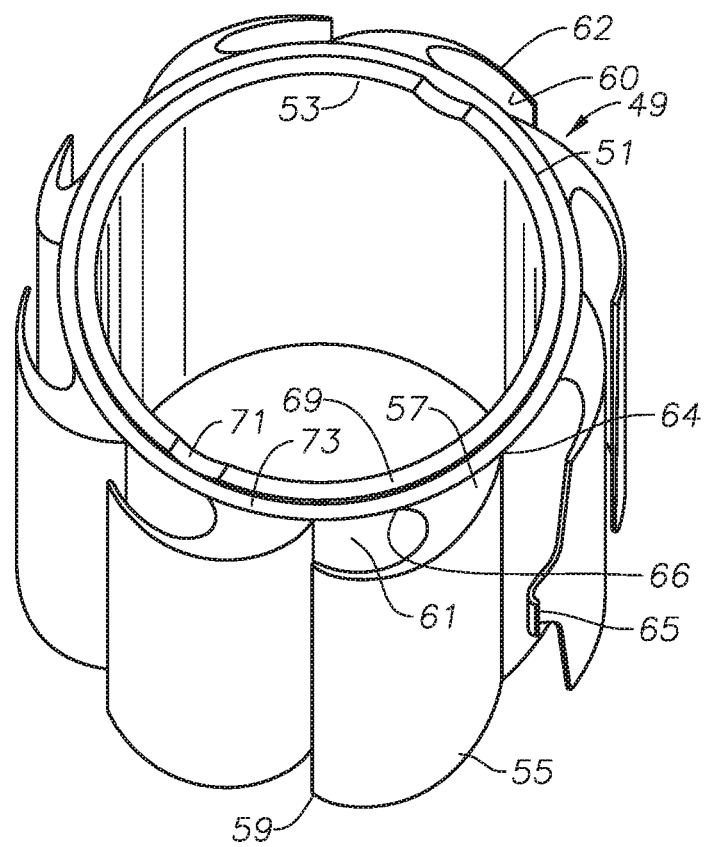
FIG. 4 is a perspective view of the bearing body of FIG. 3, shown removed from the motor.

Referring to FIG. 4, at least one of the centralizing arms 55 has an outward turned tab or flange 65 on its tip 59 that snaps into a stator bore slot or groove 67 (FIG. 2) extending axially along the inner diameter surface of stator bore 35. Two tabs 65 are shown in FIGS. 2 and 3, the tabs 65 being 180 degrees apart from each other. FIG. 4 shows tab 65 as having an axial length less than centralizing arm tip 59 and centered between the lower end and the upper end of centralizing arm 55. Alternately, tab 65 could have the same axial length as centralizing arm 55 and extend from the lower to the upper end of tip 59. Each tab 65 may be in a radial plane emanating from axis 39.

FIG. 4 shows one end of bearing body 49, and the ends may be identical. A circular rim 69 on each end of hub 51 may have a plurality of shallow recesses or scallops 71 for retaining lubricant. Also in this example, rim 69 is encircled by a circular shoulder 73. Rim 69 extends upward from shoulder 73 a short distance.

Figure 5:
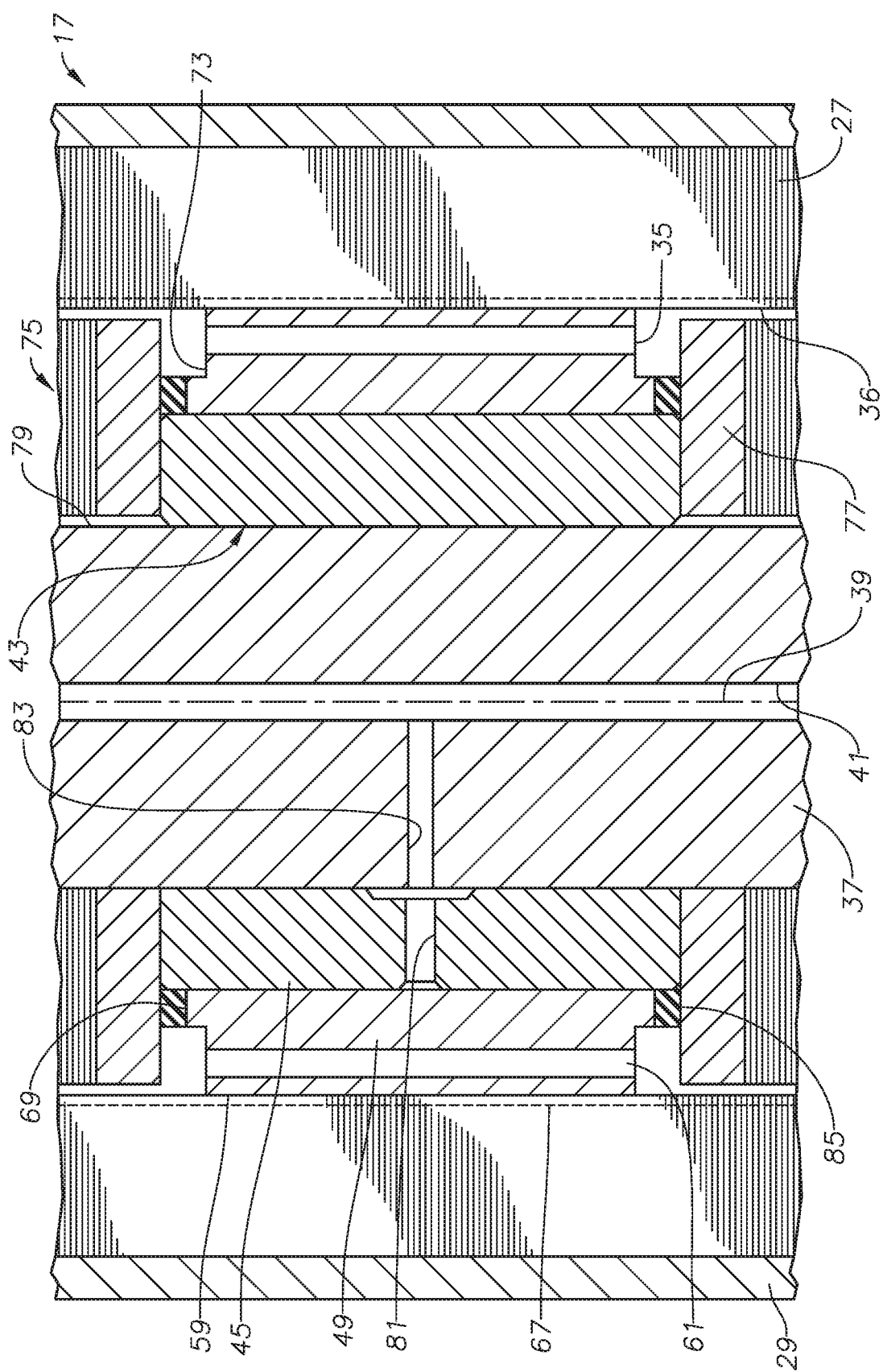
FIG. 5 is sectional view of the motor and radial bearing of FIG. 2, taken along the line 5-5 of FIG. 2.

FIG. 5 shows one radial bearing 43 located between the lower end and upper end of two rotor sections 75. Motor 17 will have several rotors sections 75, depending upon the length of the motor. Each rotor section 75 may be conventional and is made up of laminations, which are also steel discs. Copper rods (not shown) may extend axially through the rotor laminations and are spaced around axis 39. In a permanent magnet type of motor, magnets may be mounted around each rotor section 75 instead of copper rods. The rotor laminations and the ends of the copper rods are secured together by a copper end ring 77 at each end of each rotor section 75. An axially extending keyway 79 extends along the inner diameter of each rotor section 75 and on shaft 37 for receiving a key (not shown) to cause rotor sections 75 to rotate with shaft 37. Rotor sections 75 may be free to move small increments axially relative to shaft 37 in response to thermal growth. As an example only, each rotor section 75 may be about a foot or so in length, and motor 17 may be up to 30 feet in length or more.

One of the radial bearings 43 locates between each of the rotor sections 75 to radially stabilize shaft 37 during rotation. Bearing sleeve 45 is free to slide axially on shaft 37 a small increment. In this example, bearing sleeve 45 has one or more transverse lubricant ports 81 extending from its inner diameter to its outer diameter. Lubricant port 81 is in fluid communication with a shaft lubricant port 83. Lubricant flowing through shaft axial passage 41 flows through shaft and sleeve lubricant ports 83, 81 for lubricating radial bearings 43.

The upper end of bearing sleeve 45 abuts end ring 77 of the next upward rotor section 75, and the lower end of bearing sleeve 45 abuts end ring 77 of the next lower rotor section 75. Bearing sleeve 45 thus fixes the axial distance between end rings 77 of adjacent rotor sections 75.

The axial length of bearing body 45 is less than the axial length of bearing sleeve 49 in this embodiment. Thrust washers 85 are located between upper rim 69 of bearing body 49 and the end ring 77 of the next upward rotor section 75 as well as between the lower rim 69 of bearing body 49 and the end ring 77 of the next lower rotor section 75. Thrust washers 69 may overlie lubricant scallops 71 (FIG. 4). Centralizing arm recesses 61 are open at both the lower and upper ends of carrier body 49, allowing lubricant to circulate. Thrust washers 85 are configured to avoid blocking the upward and downward flow. In this example, the outer diameter of each thrust washer 85 is no greater than the outer diameter of hub 51.

Manufacturing tolerances can result in some of the rotor sections 75 being slightly off center, which could result in vibration of shaft 37. Because of the pre-load of centralizing arms 55, they may flex and elastically deflect during operation to dampen the vibration. The pre-load of centralizing arms 55 also accommodates differences in the coefficients of thermal expansion between radial bearing 43 and stator 27.

While the disclosure has been shown in only one of its forms, it should be apparent to those skilled in the art that various changes may be made. For example, the springing action provided by centralizing arms 55 could be achieved without curving the arms. The centralizing arms could be straight but inclined tangentially relative to the exterior of bearing body 49. Also, they could extend on straight lines tangentially from radial protrusions on bearing body 49.

The invention claimed is:

1. A submersible pump electrical motor, comprising:
a stator having a stator bore with a longitudinal axis and an inward-facing stator bore wall;
a shaft extending through the stator bore along the axis;
first and second rotor sections mounted to the shaft for rotation therewith;
a bearing body having a hub with a hub bore through which the shaft extends, the hub having an outward-facing surface; and
a plurality of centralizing arms, each of the arms having a base that join the outward-facing surface of the hub, each of the arms curving outward from the hub to a tip and are biased against the stator bore wall; wherein
each of the arms has an inward-facing side that curves continuously from the base to the tip and is radially spaced outward from the outward-facing surface of the hub;
each of the arms has an outward-facing side that curves continuously from the base to the tip;
the stator bore wall has an axially extending slot;
a tab extends radially outward from the tip of one of the arms into the slot to prevent rotation of the bearing body relative to the stator;
the bearing sleeve has a first end in abutment with the first rotor section and a second end in abutment with the second rotor section; and
the hub has an axial dimension between first and second ends of the hub that is less than an axial dimension between the first and second ends of the bearing sleeve.

2. The motor according to claim 1, wherein:
a radial line passes through a junction of the outward-facing surface of each of the arms with the hub and also through a tip of an adjacent one of the arms.

3. The motor according to claim 1, wherein an upper end of each of the arms is adjacent an upper end of the hub and a lower end of each of the arms is adjacent a lower end of the hub.

4. The motor according to claim 1, wherein each of the arms gradually decreases in thickness from the base to the tip of the arm.

5. The motor according to claim 1, wherein the arms circumscribe an outer diameter while the bearing body is removed from the stator bore that is greater than an inner diameter of the stator bore, resulting in an elastic deflection of the arms when the bearing body is inserted within the stator bore.

6. The motor according to claim 1, wherein:
all of the arms extend in a same direction relative to a direction of rotation of the shaft when the motor is powered.

7. The motor according to claim 1, wherein:
a curvature of the outward-facing side of each of the arms differs from a curvature of the inward-facing side, providing a thickness of each arm measured from the inward-facing side to the outward-facing side that continuously decreases from the base to the tip.

8. The motor according to claim 1, wherein the hub bore extends a full 360 degrees without interruption.

9. A submersible pump electrical motor, comprising:
a stator having a stator bore with a longitudinal axis and an inward-facing stator bore wall;
an axially extending slot formed in the stator bore wall;
a shaft extending axially through the stator bore;
first and second rotor sections mounted to the shaft for rotation in unison;
a bearing sleeve between the first and second rotor sections and mounted to the shaft for rotation in unison;
a bearing body having a hub with a hub bore that receives the bearing sleeve in sliding, rotational engagement;
a plurality of centralizing arms circumferentially spaced around the hub, each of the arms curving selectively into or away from the direction of rotation of the shaft, each of the arms having an outward-facing side that has a circumscribed outer diameter initially larger than an inner diameter of the stator bore wall, resulting in each of the arms deflecting radially inward and being biased against the stator bore wall once the bearing body is installed;

a tab on at least one of the arms that engages the slot to prevent rotation of the bearing body relative to the stator; wherein the bearing body, the hub, and the arms are formed of a single-piece monolithic metal that undergoes elastic deflection of the arms when the bearing body is installed in the stator bore;

the bearing sleeve has a first end in abutment with the first rotor section and a second end in abutment with the second rotor section;

the hub has an axial dimension between first and second ends of the hub that is less than an axial dimension between the first and second ends of the bearing sleeve; and the motor further comprises:

a first thrust washer between the first end of the hub and the first rotor section and a second thrust washer between the second end of the hub and the second rotor section, each of the thrust washers having a smaller outer diameter than the circumscribed outer diameter of the arms so as to avoid impeding the circulation of motor lubricant between the hub and the stator bore.

10. The motor according to claim 9, wherein the tab protrudes radially outward from the outward-facing surface of the arm on which it is located.

11. The motor according to claim 9, wherein:
each of the arms has an inward-facing surface spaced outward from the hub; and
the inward-facing surface has a different curvature than the outward facing surface.

12. The motor according to claim 9, wherein:
each of the arms has a base where it joins an exterior surface of the hub; and
each of the arms tapers in thickness from the hub to a tip of each of the arms.

13. A submersible pump electrical motor, comprising:
a stator having a stator bore with a longitudinal axis and an inward-facing stator bore wall;
a shaft extending axially through the stator bore for rotation in a selected direction when powered by the motor;
first and second rotor sections mounted to the shaft for rotation in unison;
a bearing sleeve between the first and second rotor sections and mounted to the shaft for rotation in unison;
a non-rotating bearing body having a hub and a plurality of centralizing arms circumferentially spaced around the hub, the hub having a hub bore that receives the bearing sleeve in sliding, rotational engagement;
each of the arms having a base joining the hub and each of the arms curving from the base to a tip, each of the arms having an inward-facing curved surface that curves continuously from the base to the tip and is spaced outward from the hub, and each of the arms having an outward-facing curved surface that curves continuously from the base to the tip and is biased against the bore wall; wherein
the arms are monolithic with the bearing body and the hub and formed of a metal that undergoes elastic deflection of the arms when the bearing body is installed in the stator bore;
a curvature of the inward-facing curved surface differs from a curvature of the outward-facing curved surface, causing each of the arms to gradually decrease in thickness from the base to the tip;
the stator bore wall has an axially extending slot;
a tab extends radially outward from the tip of one of the arms into the slot to prevent rotation of the bearing body relative to the stator;
the bearing sleeve has a first end in abutment with the first rotor section and a second end in abutment with the second rotor section; and
the hub has an axial dimension between first and second ends of the hub that is less than an axial dimension between the first and second ends of the bearing sleeve.

14. The motor according to claim 13, wherein:
the hub has an outward-facing cylindrical surface that is free of apertures; and
the inward-facing curved surface of each of the arms is radially outward from a portion of the outward-facing cylindrical surface of the hub.

15. The motor according to claim 13, wherein:
the base of each of the centralizing arms has an outward-facing curved surface junction where the outward-facing curved surface joins the hub; and
a radial line passing through the outward-facing curved surface junction of each of the arms also passes through the tip of an adjacent one of the arms.

16. The motor according to claim 13, wherein all of the arms extend from the base to the tip in a same direction relative to the direction of rotation of the shaft.

17. The motor according to claim 13 wherein:
the outward-facing curved surface of each of the arms is a compound curve with more than one radii; and
the inward-facing curved surface of each of the arms is a compound curve with more than one radii.

18. The motor according to claim 13, further comprising:
at least one thrust washer between one of the ends of the hub and one of the rotor sections; and wherein
an outer diameter of the at least one thrust washer is no greater than an outer diameter of the hub.

* * * * *